United States Patent [19]

Sheller

[11] Patent Number: 5,384,099
[45] Date of Patent: * Jan. 24, 1995

[54] CORE ELEMENT FOR CATALYTIC CONVERTER

[75] Inventor: David T. Sheller, Garrettsville, Ohio

[73] Assignee: Camet Company, Hiram, Ohio

[*] Notice: The portion of the term of this patent subsequent to Dec. 28, 2010 has been disclaimed.

[21] Appl. No.: 89,055

[22] Filed: Jul. 8, 1993

Related U.S. Application Data

[63] Continuation of Ser. No. 880,082, May 4, 1992, abandoned, which is a continuation-in-part of Ser. No. 838,547, Feb. 19, 1992, abandoned.

[51] Int. Cl.$^6$ .................................................. F01N 3/28
[52] U.S. Cl. ............................. 422/174; 422/180; 422/211; 422/222; 60/300; 60/303
[58] Field of Search ............... 422/173, 174, 177, 180, 422/199, 211, 222; 60/299, 300, 303; 55/DIG. 30

[56] References Cited

U.S. PATENT DOCUMENTS

| | | | |
|---|---|---|---|
| 3,768,982 | 10/1973 | Kitzner et al. | 422/174 |
| 3,770,389 | 10/1973 | Kitzner et al. | 422/174 |
| 4,576,800 | 3/1986 | Retallick | 422/180 |
| 4,832,998 | 5/1989 | Cyron | 428/116 |
| 4,928,485 | 5/1990 | Whittenberger | 60/299 |
| 4,942,020 | 7/1990 | Whittenberger et al. | 422/180 |
| 4,976,929 | 12/1990 | Cornelison et al. | 422/174 |
| 5,070,694 | 12/1991 | Whittenberger | 60/300 |
| 5,118,475 | 6/1992 | Cornelison | 422/174 |
| 5,140,812 | 8/1992 | Cornelison et al. | 60/300 |
| 5,187,142 | 2/1993 | Richmond et al. | 502/439 |
| 5,272,876 | 12/1993 | Sheller | 422/174 |

FOREIGN PATENT DOCUMENTS

| | | |
|---|---|---|
| 0419906 | 4/1991 | European Pat. Off. |
| 0456919 | 11/1991 | European Pat. Off. |

Primary Examiner—James C. Housel
Assistant Examiner—Jan M. Ludlow
Attorney, Agent, or Firm—Beverly J. Artale

[57] ABSTRACT

A core element for use in a catalytic converter, especially an electrically heatable catalytic converter, which core element is characterized by a corrugated thin metal strip having metal tabs attached to each end. The tabs are bent along one or more lines normal to the edges of the corrugated thin metal strip. When bent along one line, for example, an angular tab is formed. When the tabs are bent along an infinite number of lines a uniform amount, a circular segment is formed. A catalyst is deposited on one or both surfaces of the corrugated thin metal strips. A central portion of each strip is flat to enable location between the legs of a bifurcated central pin. The central pin with a group of such corrugated thin metal strips is then spirally wound about the central pin to provide a core with overlapped curved tabs defining at least two discrete generally spiral groups of resistance strips electrically isolated from each other. The strips are adapted to be connected in series with a voltage source and encased in a housing to form an electrically heatable catalytic converter.

27 Claims, 7 Drawing Sheets

CORE ELEMENT FOR CATALYTIC CONVERTER

This is a continuation, of application Ser. No. 880,082, filed May 4, 1992 now abandoned, which is a continuation-in-part of application Ser. No. 07/838,547, filed Feb. 19, 1992, now abandoned.

This invention relates to a novel core element for a catalytic converter, and especially to a core element for an electrically heatable catalytic converter. The invention also relates to an electrically heatable catalytic converter containing a core utilizing a plurality of such core elements.

BACKGROUND OF THE INVENTION AND PRIOR ART

The purpose of a catalytic converter for an internal combustion engine or a gas turbine is to convert pollutant materials in the exhaust, e.g., carbon monoxide, unburned hydrocarbons, nitrogen oxide, etc., to carbon dioxide, nitrogen and water. Conventional catalytic converters utilize a ceramic honeycomb monolith having square or triangular, straight-through openings or cells with catalyst deposited on the walls of the cells; catalyst coated refractory metal oxide beads or pellets, e.g., alumina beads; or a corrugated thin metal foil monolith, e.g., a ferritic stainless steel foil or a nickel alloy foil, having a catalyst carried on or supported on the surface. The catalyst is normally a noble metal, e.g., platinum, palladium, rhodium, ruthenium, or a mixture of two or more of such metals, and/or zeolite coatings. The catalyst catalyzes a chemical reaction, mainly oxidation, whereby the pollutant is converted to a harmless by-product which then passes through the exhaust system to the atmosphere.

However, conversion to such harmless by-products is not efficient initially when the exhaust gases are relatively cold. To be effective at a high conversion rate, the catalyst and the surface of the converter with which the gases come in contact must be at or above a minimum temperature, e.g., 390° F. for carbon monoxide, 570° F. for volatile organic compounds (VOC) and 1000° F. for methane or natural gas. Otherwise, conversion to harmless by-products is poor and cold start pollution of the atmosphere is high. Once the exhaust system has reached its normal operating temperature, the catalytic converter is optimally effective. Hence, it is necessary for the relatively cold exhaust gases to make contact with a hot catalyst so as to effect satisfactory conversion. Compression ignited engines, spark ignited engines and reactors in gas turbines have this need.

To achieve initial heating of the catalyst at or prior to engine start-up, there is conveniently provided an electrically heatable catalytic converter, preferably one formed of a thin metal monolith, either flat thin metal strips, straight corrugated thin metal strips, pattern corrugated thin metal strips, (e.g., herringbone or chevron corrugated) or variable pitch corrugated thin metal strips (See U.S. Pat. No. 4,810,588 dated Mar. 7, 1989 to Bullock et al), or a combination thereof, which monolith is connected to a voltage source, e.g., a 12 volt to 108 volt, or higher, power supply, preferably at the time of engine start-up and afterwards to elevate and maintain the catalyst to at least 650° F. plus or minus 20° F. Alternatively, power may also be supplied for 5 to 10 or so seconds prior to start-up of the engine. Catalytic converters containing a corrugated thin metal (stainless steel) monolith have been known since at least the early seventies. See Kitzner U.S. Pat. Nos. 3,768,982 and 3,770,389 each dated Oct. 30, 1973. More recently, corrugated thin metal monoliths have been disclosed in U.S. Pat. No. 4,711,009 dated Dec. 8, 1987; U.S. Pat. No. 4,381,590 to Nonnenmann et al dated May 3, 1983, copending application U.S. Ser. No. 606,130 filed Oct. 31, 1990 by William A. Whittenberger and entitled Electrically Heatable Catalytic Converter, now U.S. Pat. No. 5,070,694 dated Dec. 10, 1991, and commonly owned with the present application, and International PCT Publication Numbers WO 89/10470 and WO 89/10471 each filed Nov. 2, 1989. However, a common problem with many such prior devices has been their inability to survive severe automotive industry durability tests which are known as the Hot Shake Test and the Hot Cycling Test.

The Hot Shake Test involves oscillating (100 to 200 Hertz and 28 to 60 G inertial loading) the device in a vertical attitude at high temperature (between 800° and 950° C; 1472° to 1742° F., respectively) with exhaust gas from a running internal combustion engine simultaneously being passed through the device. If the electrically heatable catalytic device telescopes or displays separation or folding over of the leading, or upstream, edges of the foil leaves up to a predetermined time, e.g., 5 to 200 hours, the device is said to fail the test. Usually a device will fail within 5 hours if it is going to fail. Five hours is equivalent to 1.8 million cycles at 100 Hertz.

The Hot Cycling test is conducted on a running engine at 800° to 950° C. (1472° to 1742° F.) and cycled to 120° to 150° C. once every 15 to 20 minutes, for 300 hours. Telescoping or separation of the leading edges of the foil strips is considered a failure.

The Hot Shake Test and the Hot Cycling Test, hereinafter called "Hot Tests", have proved very difficult to survive, and many efforts to provide a successful device have been either too costly or ineffective for a variety of reasons.

Previously tested samples of EHC's in automotive service and comprised entirely of heater strips in electrical parallel, did not have adequate endurance in Hot Tests or did they satisfy the need for lower power ratings. In repeated efforts to arrive at a suitable design using purely parallel circuit construction, samples were made and tested with a wide range of parameters, including a length-to-diameter aspect ratio of from 0.5 to 1.5, cell densities of from 100 to 500 cells per square inch, individual strip heaters as long as 15 inches, and parallel circuits limited to as few as 2 heater strips.

Devices made according to these design parameters proved unsatisfactory in the Hot Tests because (a) terminal resistance was too low and therefore, the devices drew too much power, (b) the relatively high voltage differential between laminations associated with small numbers of parallel heater strips caused some arcing and, (c) Hot Tests could not be passed consistently. With regard to (c), EHC's with heater strips longer than about 7" measured from the center of the core to the outside of the core have generally not passed the Hot Shake Test. Resistance that is too low causes one or more of the following problems: (a) the weight and size of the battery become unacceptably high and/or expensive; (b) the EHC has to be made so large in diameter that longer heater strips have to be used which induces a tendency to fail the Hot Tests. The devices were, of course, useful in less stringent environments.

Prior structures, such as that described in U.S. Pat. No. 4,928,485 have had all of the corrugated thin metal heater strip members connected in a manner such that all of the strips extended spirally outwardly from a central electrode to a circular shell which served as the electrode of opposite polarity. The strips served as heaters for the core. However, power levels of less than 2.0 kilowatts at 7 volts measured at the EHC terminals could not be achieved when all of the heater strips were in parallel because the terminal resistance of the EHC was too low.

In the following description, reference will be made to "ferritic" stainless steel. A suitable formulation for ferritic stainless steel alloy is described in U.S. Pat. No. 4,414,023 to Aggen dated Nov. 8, 1983. A specific ferritic stainless steel useful herein contains 20% chromium, 5% aluminum, and from 0.002% to 0.05% of at least one rare earth metal selected from cerium, lanthanum, neodymium, yttrium, and praseodymium, or a mixture of two or more of such rare earth metals, balance iron and trace steel making impurities. Another metal alloy especially useful herein is identified as Haynes 214 which is commercially available. This alloy is described in U.S. Pat. No. 4,671,931 dated Jun. 9, 1987 to Herchenroeder et al. Haynes 214 is characterized by high resistance to corrosion. A specific example contains 75% nickel, 16% chromium, 4.5% aluminum, 3% iron, trace amounts of one or more Rare Earth metals, 0.05% carbon, and steel making impurities. Ferritic stainless steel and Haynes 214 are examples of high temperature resistive, corrosion resistant metal alloys useful herein. Suitable alloys must be able to withstand temperatures of 900° C. to 1100° C. over prolonged periods.

Other high temperature resistive, corrosion resistant metal alloys are known and may be used herein. The thickness of the metal foil heater strips should be in the range of from 0.001" to 0.005 preferably 0.001" to 0.002". The term "thin" as used herein means a thickness of the metal strip in the range of from 0.0015" to about 0.005". The two alloys mentioned above have been found most satisfactory for use in the present invention, especially Haynes 214.

In the following description, reference will also be made to fibrous ceramic mat, woven ceramic fiber tape, or insulation. Reference may be had to U.S. Pat. No. 3,795,524 dated Mar. 5, 1974 to Sowman and to the Hatch U.S. Pat. No. 3,916,057 dated Oct. 28, 1975 for formulations and manufacture of ceramic fibers and mats useful herein. One such ceramic fiber material is currently available from 3-M under the registered trademark "NEXTEL" 312 Woven Tape and is especially useful herein. Ceramic fiber mat is available as "INTERAM" also from 3-M.

It is a principal object of the present invention to provide a core element which enables simplified, less costly manufacture of a core useful in a catalytic converter.

BRIEF STATEMENT OF THE INVENTION

Briefly stated, the present invention is a core element for a catalytic converter, especially an electrically heatable catalytic converter, which core element comprises a corrugated thin metal strip having oppositely directed bent metal tabs secured to each end of said strip said tabs being angularly bent along one or more lines normal to the edges of the corrugated thin metal strip. Where there are an infinite number of lines along which the tab is uniformly angularly bent, the result is a segment of a circle and both tabs have the same radius of curvature. In preferred embodiments, the tabs have the same width as the thin metal strip. Also in preferred embodiments, the corrugated thin metal strip has a transversely extending flat portion in the middle of the strip.

BRIEF DESCRIPTION OF THE DRAWINGS

The invention may be better understood by having reference to the annexed drawings showing preferred embodiments of the invention and illustrating the manner of making a catalytic converter core therefrom, and wherein.

DETAILED DESCRIPTION OF THE DRAWINGS

As indicated above, the present invention is a novel core element especially useful in an electrically heatable catalytic converter. The core elements are strips of thin corrugated high temperature resistive, oxidation resistant thin metal alloy strips having oppositely directed bent metal tabs at each end. By "thin" is meant 0.0015" to about 0.005". A distinguishing feature of the core elements of the present invention is that the tabs have a portion thereof at the free end displaced out of the plane of the tab; and these tabs when the strips to which they are attached are tightly spirally wound about a central post or pin, overlap and define a segmented generally circular retainer shell about the core elements. A series of the tabs when welded together as shown, for example, in FIGS. 10 and 11, define an electricity conductive connector for a plurality of heater strips connected in parallel, there being at least two such electrically conductive segments in a given core. There may be more such spaced electrically conductive segments at the ends of a corrugated strip in a given core. All such segments are spaced from each other and connected in series with the voltage source. These tabs are partially overlapped and when welded together define a generally circular segment. The thin foil strips are corrugated, desirably in a herringbone pattern, so that contiguous spiral convolutions do not nest and thus blind the core to the passage of exhaust gas therethrough. This eliminates the need for alternate flat thin metal strips. Other nonnesting patterns for the corrugations may be used, e.g., variable pitch corrugations. The structure of the core elements hereof enables a simplified manufacture for the cores which lends itself to a continuous manufacturing process. The cores as defined herein, when included in a suitable housing, have been found to survive the "Hot Tests" described above.

Figure 1:
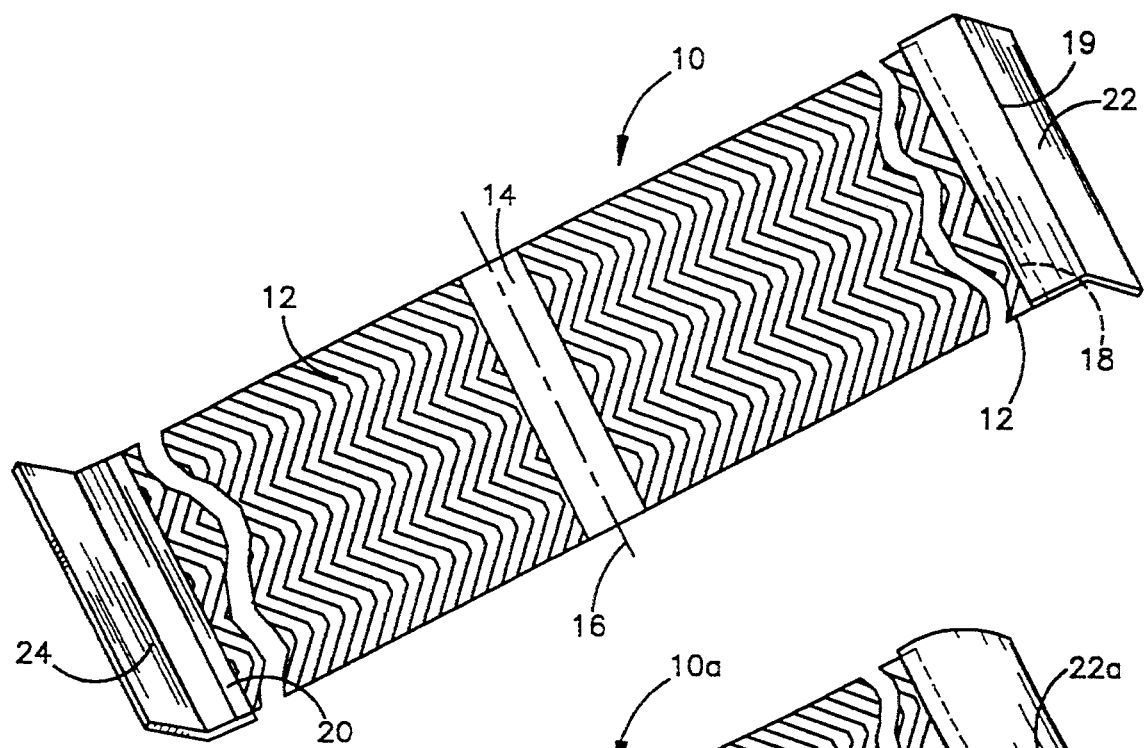
FIG. 1 is a perspective view of a core element in accordance with the present invention and illustrates the best mode of practicing the invention know to me at this time.

Referring now more particularly to the drawings, FIG. 1 is the best mode of carrying out this invention presently known to me and shows a core element 10 in accordance with the present invention. The core element 10 is formed from a strip of thin, e.g., 0.002" thick, high temperature resistive, oxidation resistant metal alloy 12, such as Haynes 214, or a ferritic stainless steel. The strips may be continuously corrugated and coated with a thin coating of a refractory metal oxide, for example, 0.0002" to 0.0015" thick, and with at least one overlay catalyst metal, by a process such as described in U.S. Pat. No. 4,711,009, supra. In using the foregoing process, final steps including creasing and accordion folding are omitted; cutting the precoated strip to a predetermined length, flattening the middle portion and the ends, and wire brushing the coating from the ends are steps which are added to said process. Alternatively, the finished corrugated strip may be stamped and then coated with a refractory metal oxide coating, e.g., alumina, titania, alumina/ceria, titania/alumina, titania/ceria, magnesia/zirconia, etc. A preferred refractory metal oxide composition is 75% gamma alumina/25% ceria. The coating may be applied by wash-coating followed by calcining, or by plasma spray. A noble metal catalyst, e.g., platinum/rhodium mixed catalyst, is then applied to the coated surface. The strip 12, as shown in FIG. 1, is provided with a herringbone corrugation pattern. This pattern provides a mixed flow of the exhaust gas along a zig-zag path from inlet to outlet. A straight-through flow follows an axial path straight though from inlet to outlet.

Figure 2:
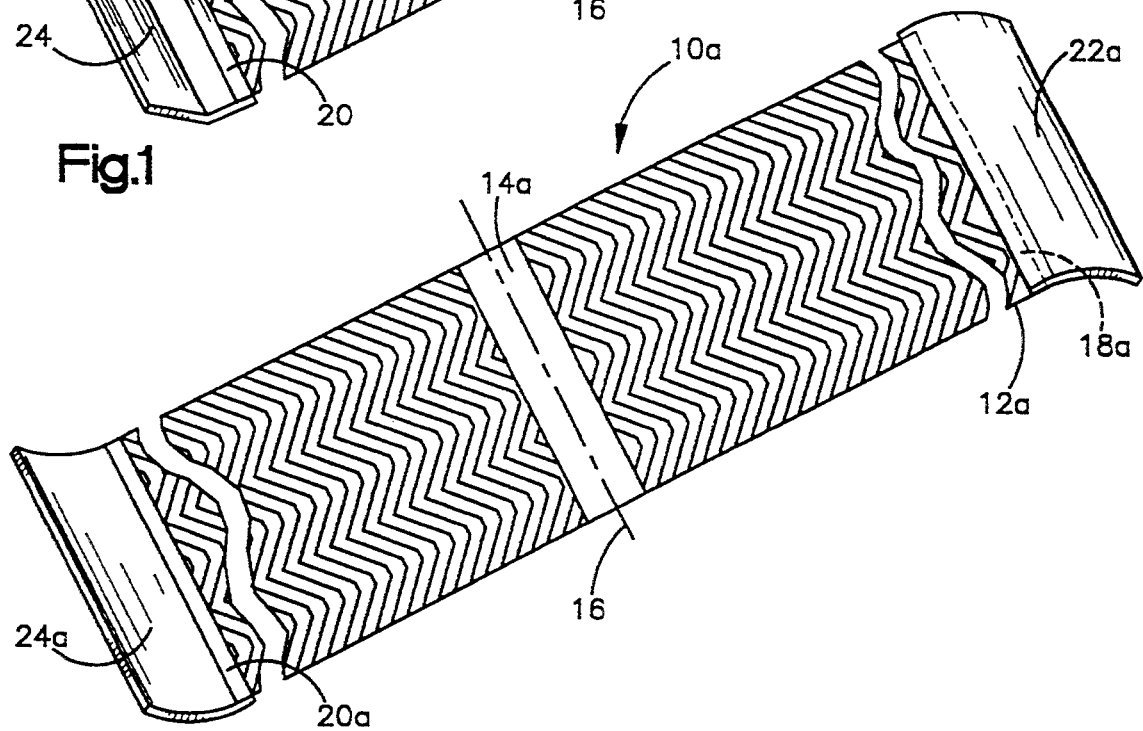
FIG. 2 is a perspective view of another core element in accordance with the present invention.
Figure 3:
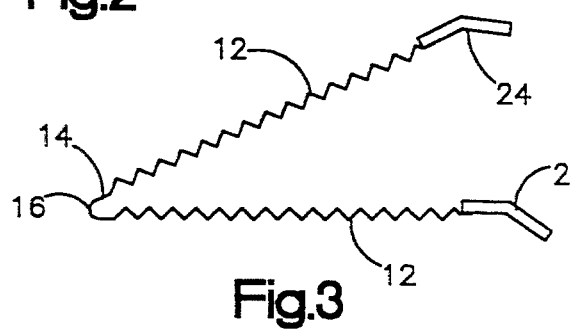
FIG. 3 is an end view of the core element of FIG. 1 folded in half along a transverse line bisecting the flat central portion of the corrugated thin metal strip.
Figure 4:
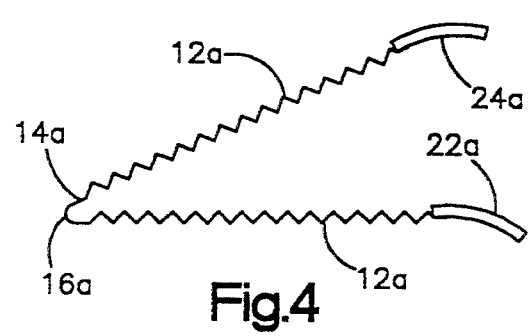
FIG. 4 is an end view of the core element of FIG. 2 folded in half along a transverse line bisecting the flat central portion of the corrugated thin metal strip.
Figure 10:
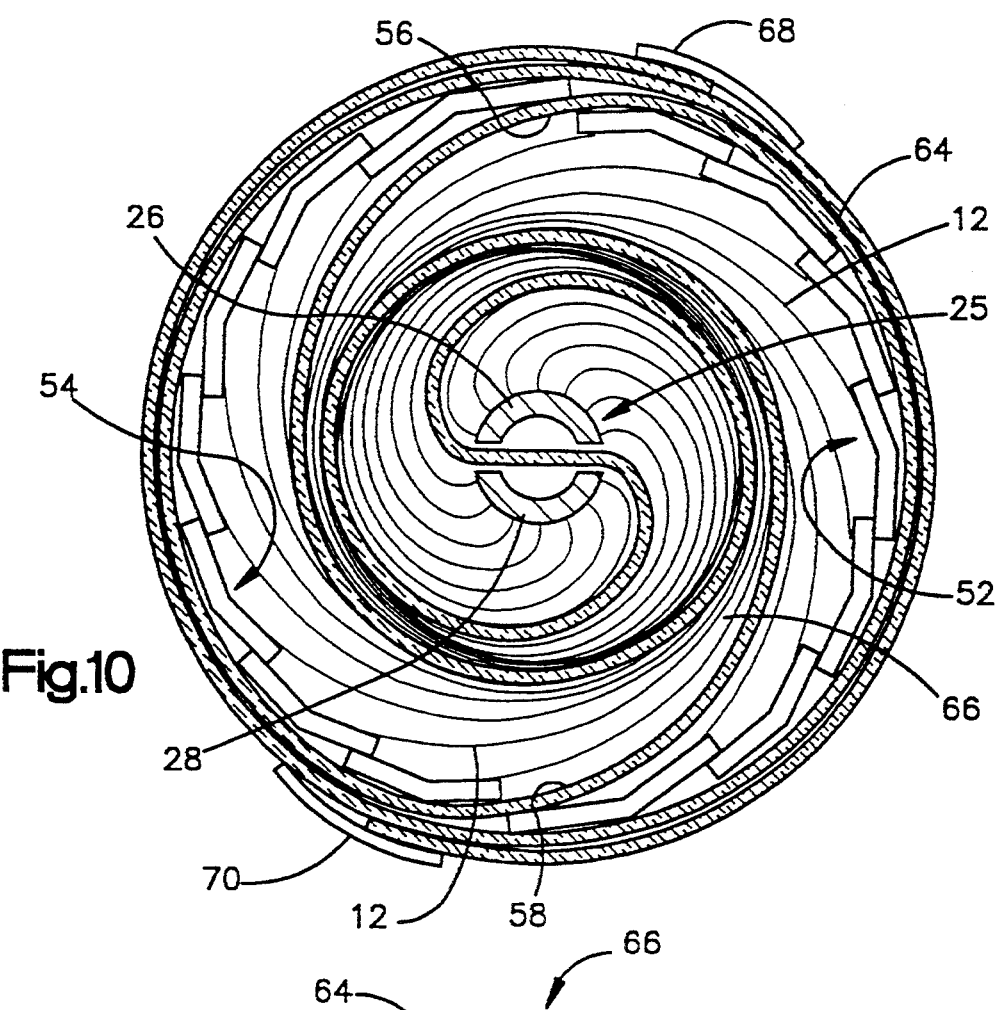
FIG. 10 is an end view of a core of the present invention with the woven ceramic fiber tapes wound about the overlapped tabs prior to welding the tabs to form the retaining shell.
Figure 11:
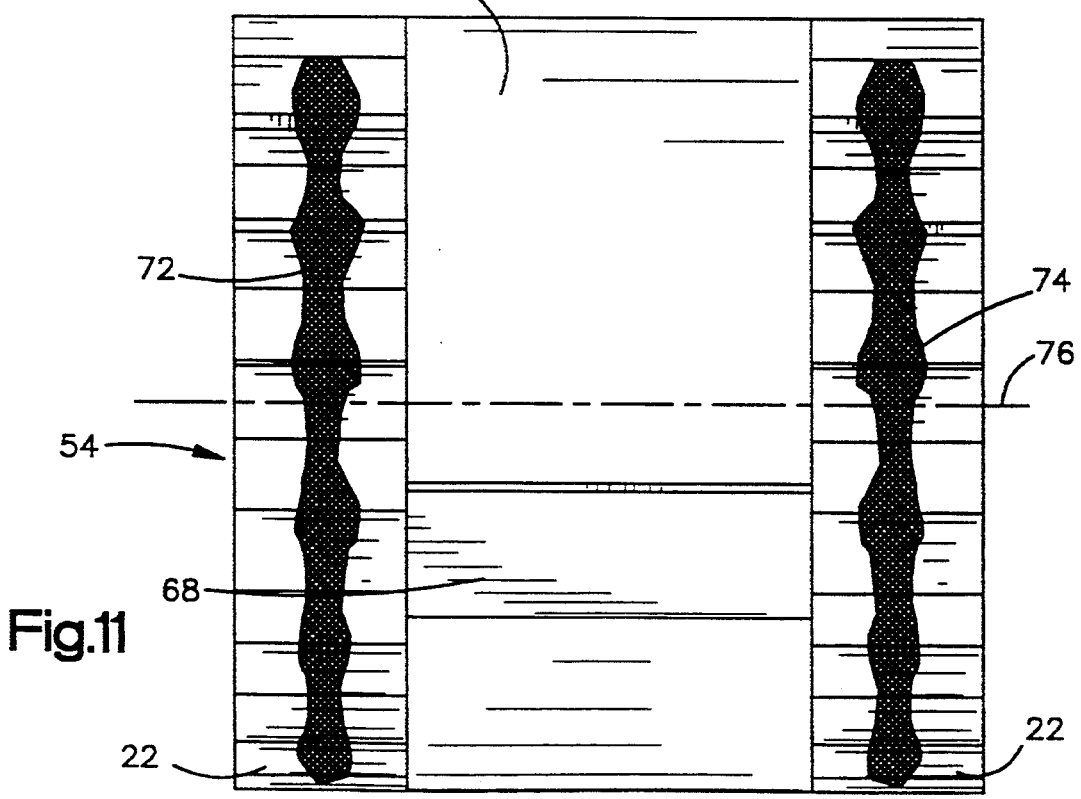
FIG. 11 is a side view of a completed catalytic converter core showing the weldments for the tabs and the woven ceramic fiber tape for insulating the core from a housing.

The strip 12 is provided with a flat portion 14 spanning the center-line 16. This is conveniently done by flattening the center portion of a pre-coated, pre-catalyzed corrugated strip as above indicated. Alternatively, a flat mid-portion can be created by selectively not corrugating what is to be the flat mid-portion of the strip. The flat portion is from ⅛th" to ¾" wide, e.g., ⅜ths". The ends 18 and 20 of the strip 12 are flattened and wire brushed to remove the refractory metal oxide coating to enable welding of the strips 12 to the tabs. Tabs 22 and 24 are angularly bent along a single transverse line 19 from 15 degrees to about 35 degrees, preferably about 26 degrees out of the plane of the tab. The tabs may be bent along more than one line, e.g., two to ten lines for example, up to an infinite number of longitudinal lines to form a circular arc as described below. The bend line 19 (FIG. 6) is preferably midway between the longitudinal edges of the tab, although displacement from the longitudinal centerline up to as much as 0.2" may occur. The tabs 22 and 24 are secured to the ends 18 and 20, one tab being in a concave position (24) and the other being in a convex position (22) relative to the same surface of the strip 12. Thus, when the corrugated strips 12 are folded along the center-line 16, or the line 16a, as shown in FIGS. 3 and 4, respectively, or spirally wound as shown in FIGS. 10 and 11, the tabs 24 and 22, and the tabs 24a and 22a overlap incompletely owing to the longer path one corrugated part of the strip 12 (or 12a) must follow with respect to the other corrugated part of the strips 12 (or 12a). Usually six or seven strips 12 are used. Tabs 25 and 27 (FIG. 5) are longer than tabs 22 and 24 in FIG. 1, and longer than tabs 22 and 24 in FIG. 1, or tabs 22a and 24a in FIG. 2. Such longer tabs 25 and 27 are located so as to be diametrically opposed when the core is spirally wound. In the positions shown in FIG. 5, tabs 25 and 27 will provide sufficient surface for stud welding a terminal, e.g., terminals 28 and 31 in FIG. 12. The terminals 28 and 31 may be ⅜" diameter nickel.

In specific embodiments, the corrugated strip 12 or 12a, from end to end is 12.25 inches long and 1.72 inches wide by 0.0020" thick. The corrugations have an amplitude of from 0.02" to 0.09", e.g., 0.025", and a pitch of from 0.08" to 0.18", e.g., 0.126". The cross-sectional shape of the corrugations may be triangular, truncated triangular, triangular with the apices rounded (preferred), wave-like, e.g., sinusoidal, etc. The pattern is desirably herringbone or chevron, with sides having a slope of from 3 degrees to 20 degrees, e.g., 16 degrees, to a line perpendicular to the longitudinal edges of the thin metal alloy strip. Alternatively, for lower pressure drop through the catalytic converter, the pattern of corrugations may be regular and straight-through corrugations backed up with a flat strip, or straight-through with a variable pitch such as described in U.S. Pat. No. 4,810,588 dated Mar. 7, 1989 to Bullock. The preferred herringbone corrugated strips shown in FIG. 1, and are used herein do not require being backed up with a flat strip to prevent nesting, which would increase cost. This latter expedient may be used however, if desired.

The tabs 22 and 24 (FIG. 3) and 22a and 24a (FIG. 4) have the same length (considering the "length" to be the longer dimension of the tab) as the width of the thin metal strip 12, or 12a, e.g., 1.72". The width of the shorter tabs is about 0.75". Tabs 25 and 27 are wider than tabs 22 and 24 to allow space for stud welding terminals as indicated below. The terminal post tabs 25 and 27 are 0.040" thick by 1.25" by 1.72". The ultimate degree of displacement of the free longitudinal edge of the tab out of the plane of the tab, or the radius of curvature depends on the ultimate diameter of the catalytic converter core. Longitudinal elements of the tab may be angularly displaced out of the plane of the tab along any one or more longitudinal elements of the tab body, e.g., a single line, or a plurality of lines, or continuously along any arc, e.g., circular, parabolic, hyperbolic, elliptic, etc. In a specific embodiment of the diameter of the core is approximately 2 inches. The tab material is metal, for example a stainless steel, e.g., #409 stainless steel, about 0.040" thick. The overlap between the corrugated thin metal strip 12 and the tabs 22 and 24 and the corresponding tabs 22a and 24a of FIG. 4, is about 0.25" and the mode of attachment to the ends of the strips 12 or 12a is by welding, e.g., spot welding. The arcuate tabs 12a subtend a circular arc of from 10 degrees to 45 degrees and overlap from 1/10th to ⅛th of the width. The radius may be from 0.75" to 6.0" or more. Twelve narrower tab pieces and two wider tab pieces are needed for a seven strip core.

Figure 5:
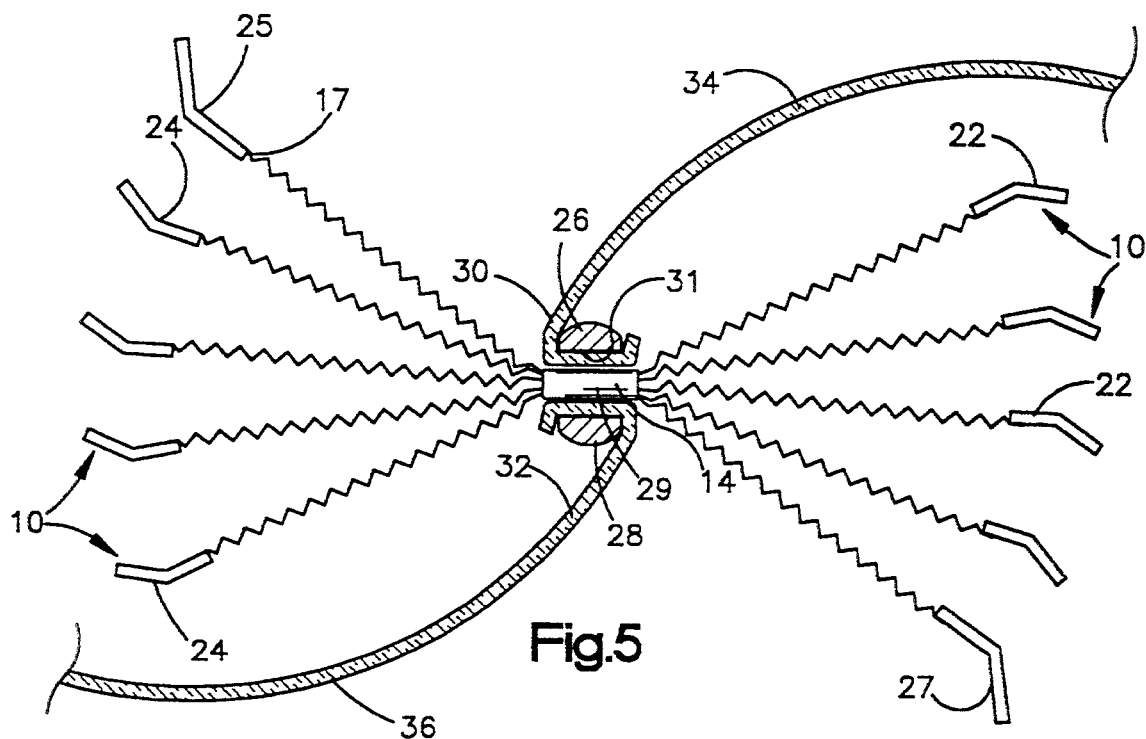
FIG. 5 is a cross-sectional view of a partially assembled core showing a plurality of core elements with their flat mid-portions extending between the legs of a bifurcated central post or pin and extended woven ceramic fiber tapes isolating the elements from the legs of the pin.

FIG. 5 shows a cross-sectional view of a core in accordance herewith prior to spirally winding the core elements 10 only five of which are shown. There may be any number of foil strips 10 from 2 to 18, e.g., 4, 6, 7, 8, 10 or more. In FIG. 5, the flat portions 14 are gathered and inserted in a gap 31 between the legs 26 and 28 of a rigid central pin which is conveniently shaped like a cotter pin. The refractory metal oxide coating and catalyst on the foil strip 12 does not have to be removed from the central flat portion 14. Legs 26 and 28 are desirably the bifurcated legs of a cotter pin shaped central post or pin. Prior to inserting the foil strips 10, the legs 26 and 28 are covered with a flexible woven ceramic sleeve 30, and 32, respectively, formed at the end of each of the flexible woven ceramic tape strips 34 and 36. The flexible woven ceramic strips 34 and 36 are 1.22" wide and 8.37" long. The legs 26 and 28 are thus insulated from contact with the foil strips 10. The woven ceramic tape strips 34 and 36 may be quite long so that they can be wrapped spirally around the final assembly of the core to insulate the core from the housing as discussed below in connection with FIG. 12. The woven ceramic tape strips 34 and 36 have a width less than the width of the foil strips 10 generally from 0.75" to 2", e.g., 1.5". This allows space at each end of the tab for welding the tabs to form partial retaining shells as described below. A separate woven ceramic strip 29 is desirably wrapped around the gathered flattened midsections 14 of the strips 10.

Figure 6:
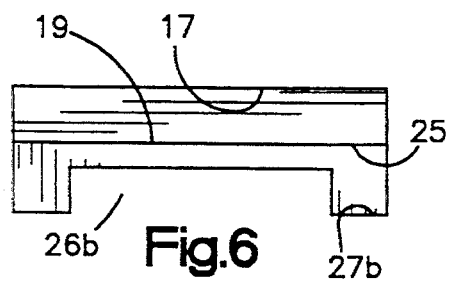
FIG. 6 is a plan view of an angularly bent tab having a notch in the free end to allow passage of the insulation strip.
Figure 7:
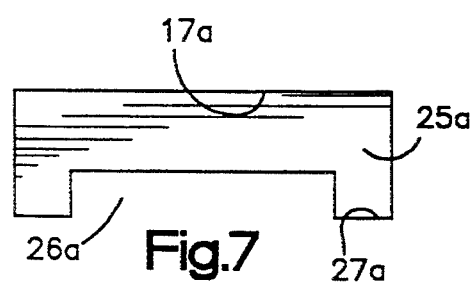
FIG. 7 is a plan view of a curved tab having a notch in the free end to allow passage of the insulation strip.

FIG. 6 shows in plan view a modified form of end tab, e.g., end tab 25 in FIG. 5. Here, there is provided a notch 26b in the free edge 27b. The notch 26b enables the passage of a woven ceramic tape strip, e.g., woven ceramic tape strip 36 in FIG. 5, to the exterior of the core. The opposite edge 17 or 17a is the edge which is welded to the corrugated foil strip, e.g., the corrugated foil strip 12 in FIG. 1, or the corrugated foil strip 12a as shown in FIG. 2. The width of the notch is from 0.025" to about 0.1" in FIGS. 6 and 7, and the length of the notch 26b or 26a is sufficient to accommodate the width of the woven ceramic tape, e.g., 1.5".

Prior to inserting the core into the housing 120 (FIG. 12), the core is conveniently held together by means of clamps or conveniently, a 0.02" diameter wire wrapped about the outside diameter. This wire serves to retain the core through final insertion into the housing 120. The assembled EHC is electrically tested and when connected to a power source, the 0.02" wire fixture is destroyed because of the short circuit created around the O.D. of the core. With the removal of the 0.02" wire tie, the core becomes supported and retained by the woven ceramic tape and the housing 120.

Figure 8:
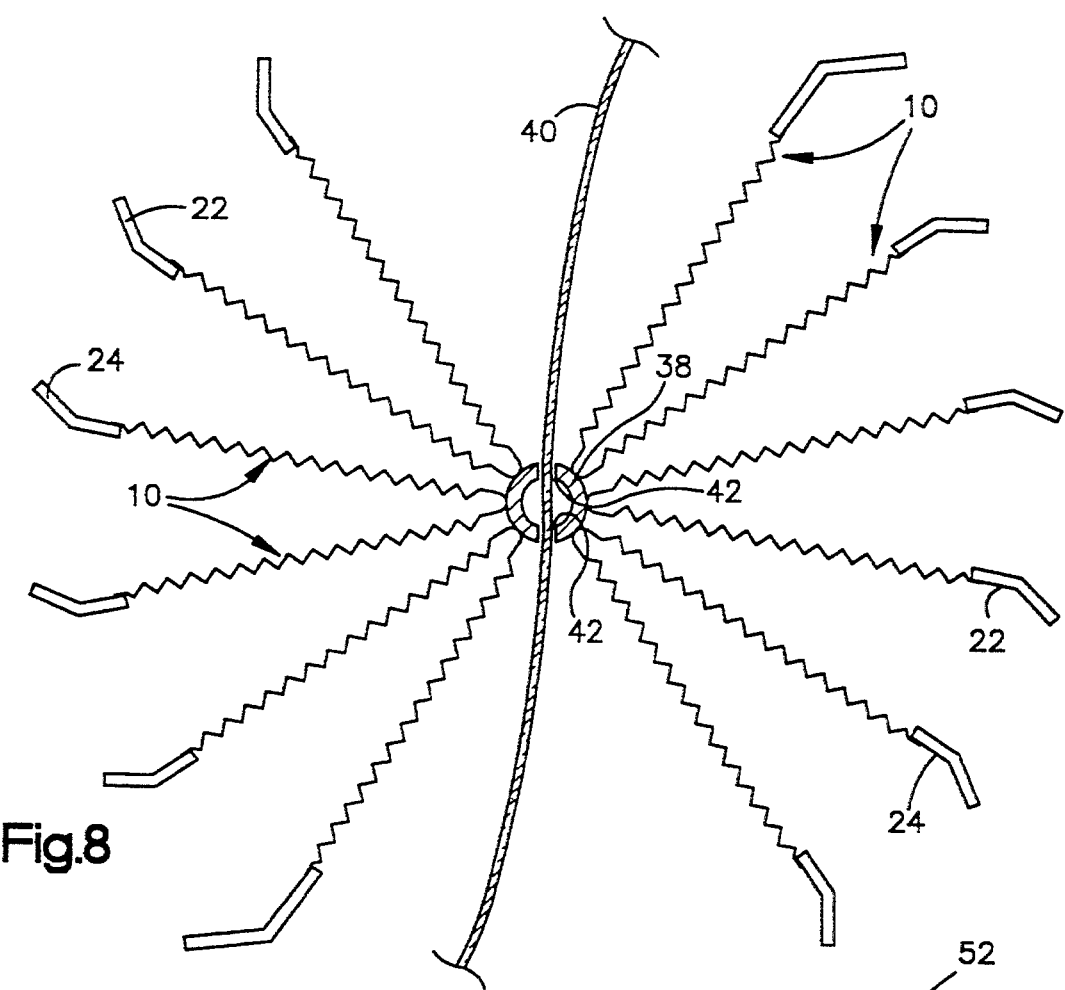
FIG. 8 is a cross-sectional view of an alternative partially assembled core also showing a plurality of folded core elements with their flat mid-portions welded to a central tubular pin and with extended woven ceramic fiber tape extending through an axially extending slot in the tubular pin.

FIG. 8 shows an alternative structure similar to that shown in FIG. 5. In this embodiment, the foil strips 10 are folded at their midpoints and welded along the resulting fold line (16 in FIG. 1) to a central post which is a tube 38, preferably closed at at least one end, and conveniently made of nickel. The woven ceramic tape 40 fits through an elongated slot 42 extending diametrally through the tube 38. There is no problem of shorting between adjacent foil strips 10. First, the strips 10 have a dielectric coating of refractory metal oxide, e.g., alumina, on the surface thereof. Second, the potential difference between contiguous strips at any point along the length thereof from one tab 22 to a corresponding tab 24, is small.

Figure 9:
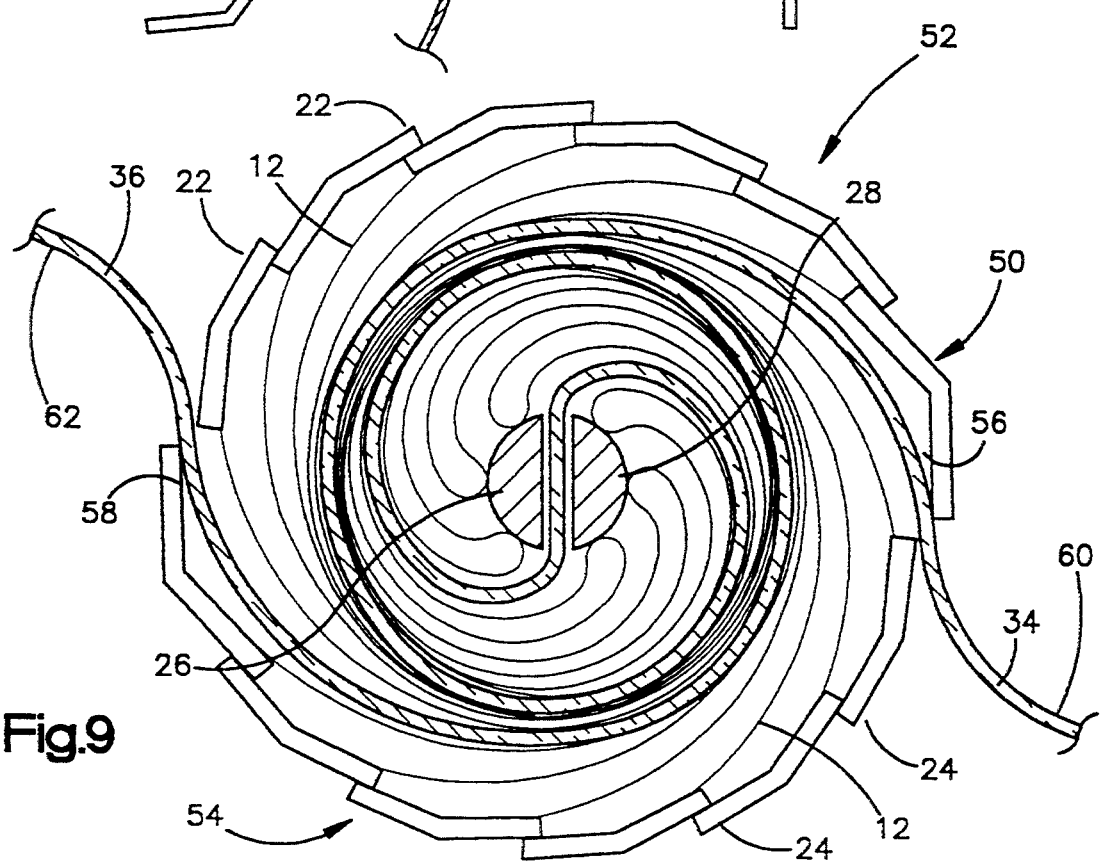
FIG. 9 is an end view of a spirally wound core composed of a plurality of core elements, such as shown in FIG. 1 showing the overlapping of the core element tabs to form a segmented retaining shell with the woven ceramic fiber tapes extended externally of the retaining shell.

FIG. 9 shows an end view of a spirally wound core using a split pin with legs 26 and 28, such as shown in FIG. 5. When a structure, such as that shown in FIG. 5, is spirally wound about the legs 26 and 28, the tabs 22 of the several core elements 10 become arranged in overlapping relation as shown, and the tabs 24 of the several core elements 10 also become arranged in overlapping relation. The woven ceramic fiber tapes 34 and 36 are simultaneously spirally wound with the foil strips 10, and because of their much greater length separate the partial shell parts 52 and 54 at the gaps 56 and 58 and extend well beyond as shown in FIG. 9. The woven ceramic tapes 34 and 36 also serve the very important function of electrically isolating groups of foil strips from one another. The tail portions 60 and 62 are of sufficient length to provide at least a double layer 64 (FIG. 10) of woven ceramic fiber tape insulation over the outside of the shell parts 52 and 54. The thickness of the insulation layer 64 is from about ⅛" to ⅜" and serves to isolate electrically the spirally wound core 66 from a housing later described. When the core elements 10 have been fully spirally wound about the central pin or post 26/28, the ends of the elongated tails 60 and 62 (FIG. 5) of the woven ceramic tape strips 34 and 36 are taped with a suitable adhesive tape, e.g., adhesive tape portion 68 and 70. Duct tape may be used for this purpose. The shell segments 52 and 54 each cover less than 180 degrees of circular arc and are connected in series to the voltage source, e.g., a battery. The plural core elements 10 are connected in parallel between the shell segments 52 and 54. If, for example, there were four shell segments (such as segments 52 and 54 although of lesser circular arc, for example) each of the segments would subtend arcs of less than 90 degrees and be connected in series with each other through the core elements 10 and in series with the voltage source.

As shown in FIG. 11, the visible ends of the tabs, e.g., the tabs 22 which are in overlapping relation, are welded together along axially spaced generally circumferential lines 72 and 74, e.g., by MIG (metal-inert gas) or TIG, (tungsten-inert gas) welding, so that the tabs 22 and the tabs 24 (not shown in FIG. 11) form, respectively, rigid, electricity conductive shell portions 52 and 54 (FIG. 10), shell portion 52 not being shown in FIG. 11. The woven ceramic tape layer 64 and an adhesive tape portion 68 are shown in FIG. 11. The center-line 76 denotes the axis of the core 66.

Figure 12:
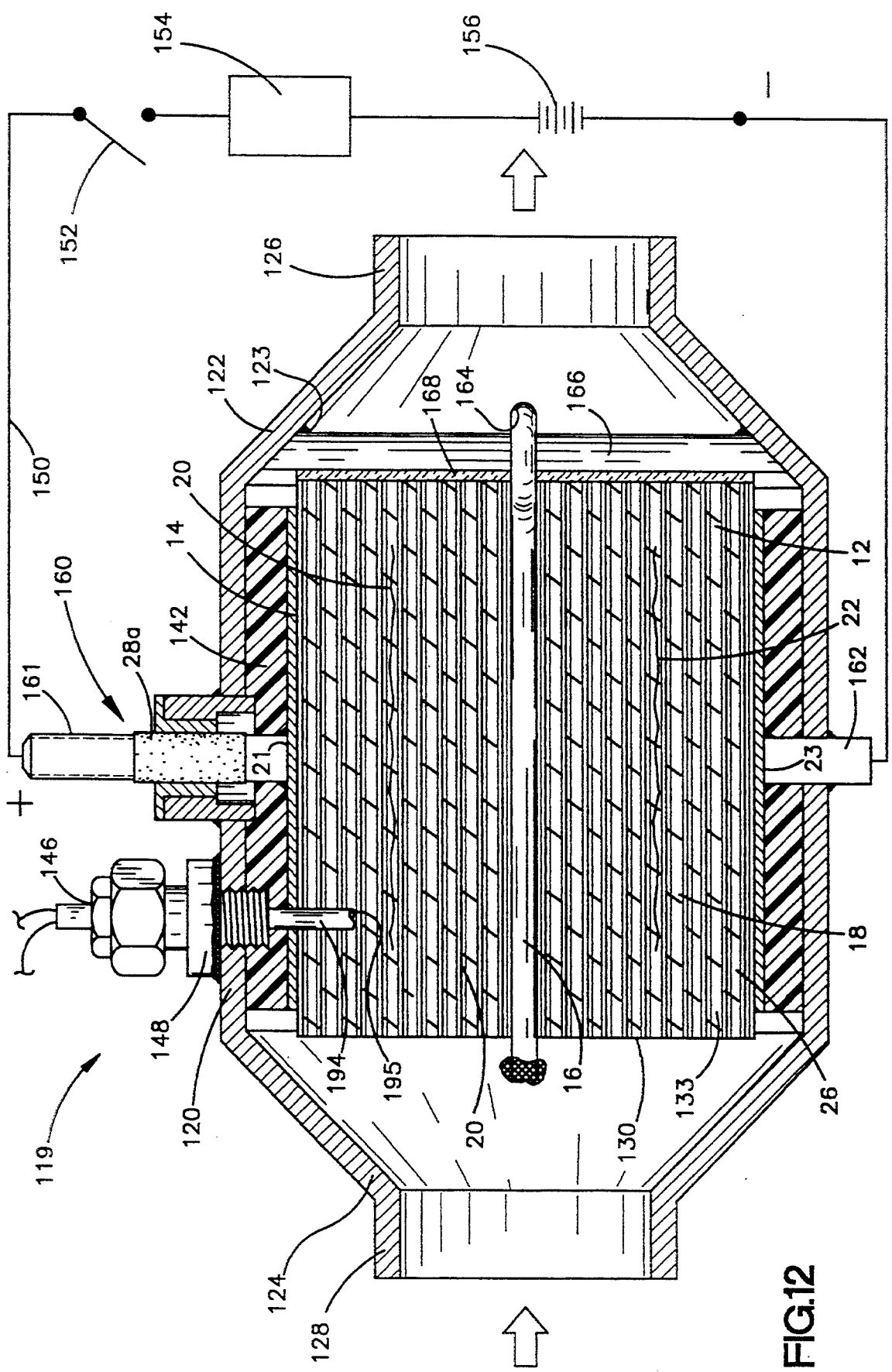
FIG. 12 is a cross-sectional view of an electrically heatable catalytic converter utilizing core elements of the present invention.

FIG. 12 shows in cross-section an electrically heatable catalytic converter 119 utilizing a core in accordance with the present invention. This assembly is ready for insertion in the exhaust line of an internal combustion engine. The converter 119 is provided with a housing 120 formed of stainless steel, e.g., #304 or #409 stainless steel, or alloy metal, having flared end caps 122 and 124, and nipples 126 and 128 integral therewith. The nipples 126 and 128 are dimensioned to accommodate a vehicle exhaust pipe, e.g., a 2.5" ID pipe. The housing 120 contains an electrically heatable catalytic converter core 130, e.g., that shown in FIG. 11 utilizing core elements 10 such as shown in FIG. 1. The core 130 defines a plurality of generally axially extending cells 133, diagrammatically shown, for convenience, in FIG. 12 as a plurality of parallel lines. As indicated above, the shell segments 52 and 54 are electrically isolated from each other. The core 130 is permeable to exhaust gas with the flow being indicated by the arrows at the inlet end and the outlet end. The core 130 is formed of a plurality of corrugated thin high temperature resistive, oxidation resistant metal alloy strips 12 (FIGS. 1, 2, 3, 4, 9, and 10). The middle portions of the thin metal foil heater strips 12 are gripped by the legs 26 and 28 of the central post or pin 26/28 along with insulation strips 34 and 36. In the embodiment shown in FIG. 12 the central post or pin 26/28 as in the form of a cotter pin and had an eye 164 which surrounds a diametrically extending bar 166 having a plasma applied coating 168 to insulate the bar from the ends of the core elements 10. The coated bar 166 abuts the ends of the core elements 10 at the downstream end of the core, and aids in preventing telescoping of the core 130. The bar 166 is welded at its extremities to the end cap 122. The legs 26 and 28 form a couple which facilitates spiral winding of the core 130. The terminals 160 and 162 extend through the housing 120 and are suitably connected to a power source 156 through a suitable power switching device 154 (see Ser. No. 587,219 filed Sep. 24, 1990 by W. A. Whittenberger et al) by cable 150 and switch 152. The insulation layer 142, formed as indicated above, electrically isolates the core 130 from the housing 120. At the time the housing half shells (which is the most convenient way of surrounding the core 130 with the housing 120) are applied and the insulation 142 in place, it is desirable to cement very thin foil sections to the outer surface of the insulation 142 in the region where the half shells mate. This is to prevent ceramic fibers from the insulation layer 142 from being pinched between edges of the half shells of the housing 120. These foil sections serve no purpose in the devices hereof.

The end caps 122 and 124 are the last parts to be attached as by seam welding. Optionally, a thermocouple 194 having a junction 195 may be placed in the core 130 to sense temperature. The leads of the thermocouple 194 pass through an insulator 146, preferably a ceramic sleeve 146, and a bushing 148 extending through the housing 120. The projecting stud 161 of the terminal 160 is desirably threaded to accept a nut or a pair of nuts, (not shown) to hold a standard cable connector from cable 150 extending from the positive pole of a battery 156 as above indicated. The negative pole of the battery, which may be a 12 volt, 24 volt or 48 volt battery, for example, may be attached to the terminal 162, or indirectly attached to the terminal 162 through the chassis of the vehicle which, in turn, is attached to the battery 156 by a conventional ground strap.

The cell density of the core 130 is conveniently in the range of from 80 to 350 cells per square inch, preferably 100 to 180 cells per square inch, and in a specific embodiment 160 cells per square inch.

Figure 13:
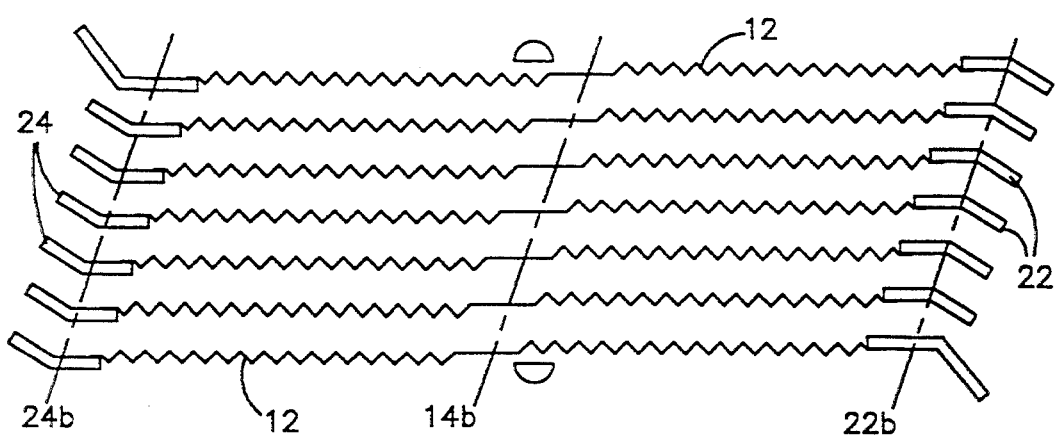
FIG. 13 shows an alternate arrangement of the core elements hereof in a staggered relationship prior to winding into a spiral about a central pin and indicating regions of common voltage by dotted lines.
Figure 14:
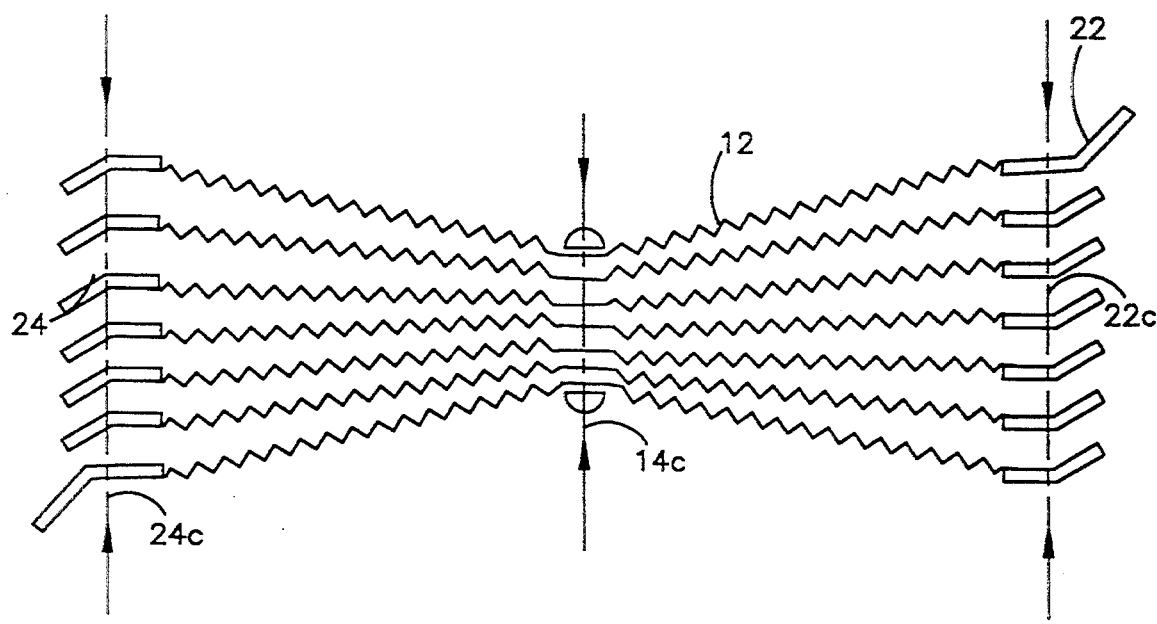
FIG. 14 is a view of a nonstaggered arrangement of foil strips and showing by dotted lines regions of common voltage.

FIG. 13 shows a staggered relationship for the strips 10. This arrangement modifies the amount of overlap. The extent of the stagger is desirably 0.25" between one tab and the next adjacent tab. In a core, such as that shown in FIG. 5, where the strips 10 are not staggered, the voltage difference at the center, is slight for each strip 10. Toward the distal ends of the heater strips 10, the voltage difference becomes gradually larger and may reach a point where arcing can occur. By staggering the strips 10 as shown in FIG. 13, the point of accumulated voltage can be moved out from the center and more evenly distributed throughout the core to avoid the potential for arcing, with the points of highest potential difference being maximum in a small region remote from the center of the core. The center lines 24b, 14b and 22b indicate the points of matched voltage or potential. FIG. 14 shows the strips 12 in nonstaggered relation and the center lines 24c, 22c and 14c show the lines of matched voltage or potential. Here, the voltages tend to aggregate to a higher level than with the staggered relationship and the potential for arcing is higher. In other words, the voltage gradient in the case of a staggered relationship is such that the voltage differential at any point between adjacent strips is less than would be the case with no mechanical offset.

Figure 15:
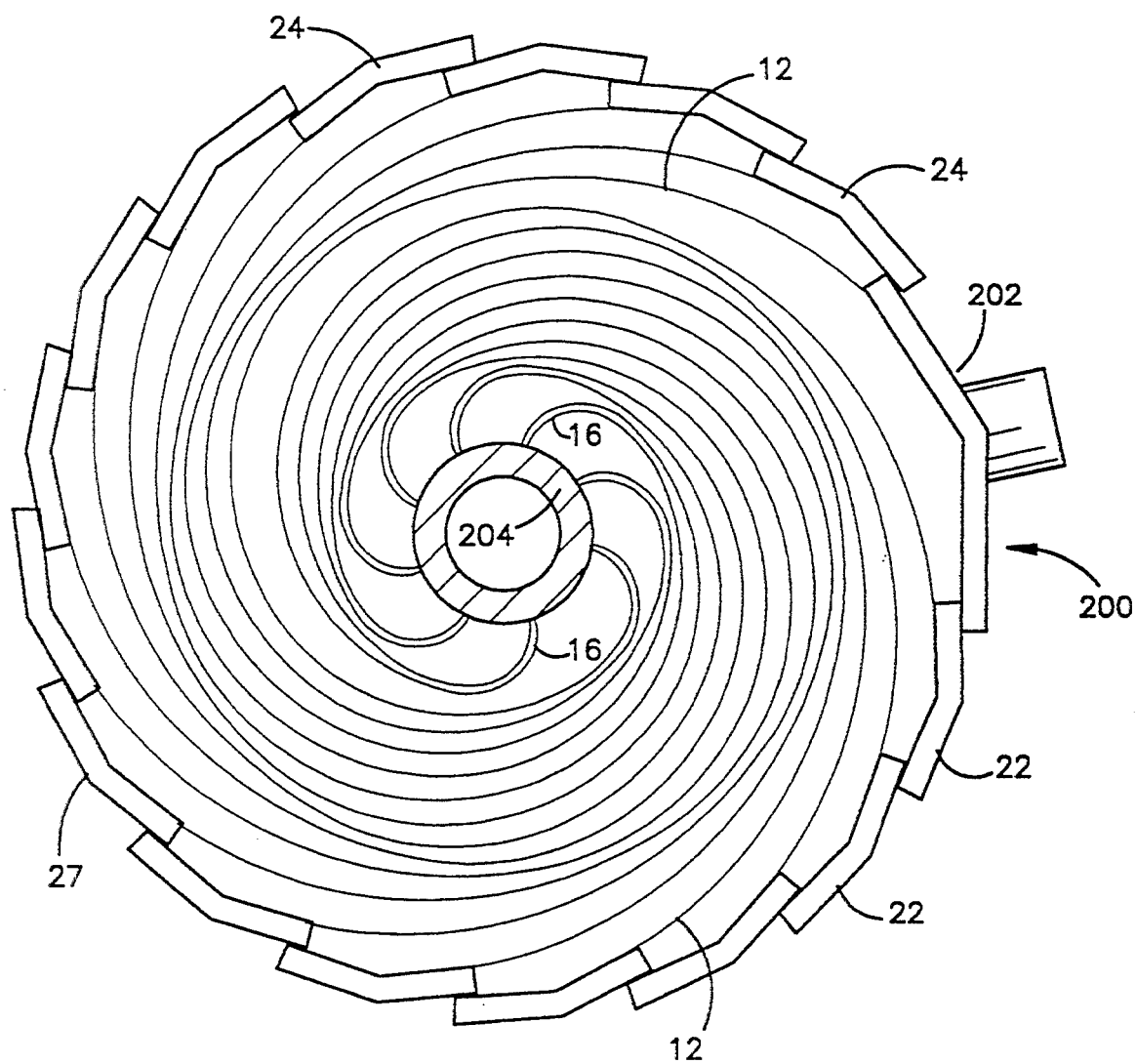
FIG. 15 is a view of a core having angularly bent tabs, like those shown in FIG. 1, at the distal ends of the foil strips forming when welded (as shown, for example, in FIGS. 10 and 11) a complete shell about the spirally wound foil strips and having the proximal ends of the foil strips attached to a central tubular post.

FIG. 15 shows another use for the end tabs of the present invention. Here, the outer shell 200 formed by the overlapping end tabs 22, 24 and a single longer end tab 202 is a full, rigid, generally circular body and no woven ceramic tape insulation strips are provided. Only one longer tab 202 is required in this structure as the central tubular core 204 is connected to one pole of a voltage source. The other pole of the voltage source is attached by a feed through terminal stud welded to the tab 202. The foil heater strips may be anchored at their proximal extremities by welding, for example, to an electricity conducting metallic central tubular core 204. Alternatively, folded core elements such as shown in FIG. 3 may be secured as by welding along the fold line 16 to the central core 204 and the assembly spirally wound as indicated in FIG. 15 to form a tightly wound metallic honeycomb. For clarity, the corrugated thin metal foil heater strips 12 are shown as unbroken lines rather than zig-zag broken lines.

While the catalytic converters hereof may be used without electrical heating, or without the associated electrical connections, terminals and insulators, the preferred embodiments are "electrically heatable." Power is supplied to the converter on demand from the time of engine start-up, and/or prior to engine start-up, or at any time the catalyst is under its predetermined set point temperature.

There has thus been provided a novel and improved core element for a catalytic converter, and particularly for an electrically heatable catalytic converter characterized in that the core element has bent end tabs, bent along one line as in FIG. 1, or along more than one line, e.g., the arc of a circle, and adapted, upon spiral winding of a plurality of such core elements about a central post or pin, to partially overlap and ultimately define a shell segment. The core elements hereof enable simplified manufacture amenable to automation. There has also been provided an electrically heatable catalytic converter characterized by the novel core elements hereof.

What is claimed is:

1. A core element for a core of a catalytic converter comprising (a) a corrugated thin metal strip and (b) oppositely directed bent metal tabs secured to each end of said strip, each of said tabs being generally rectangular in shape and having opposed shorter edges and opposed longer edges, said longer edges being coextensive in dimension with the width of said corrugated thin metal strip, each of said tabs being secured to said corrugated thin metal strip along one of the longer edges, the opposite edge being free, and each of the tabs being bent along one or more lines parallel to the longer edges of the tab.

2. A core element for a catalytic converter as defined in claim 1 wherein the tabs are segments of a circle including from 10 degrees to 45 degrees of arc, and each having substantially the same radius of curvature.

3. A core element as defined in claim 1 wherein at least one tab has a notch in the free edge dimensioned and configured to accommodate passage of an insulator tape.

4. A core element as defined in claim 1 wherein the corrugated thin metal strip has a centrally located flat portion with respect to the ends of the strip.

5. A core element as defined in claim 1 wherein the corrugated thin metal strip is corrugated in a herringbone pattern.

6. A core element as defined in claim 1 wherein the corrugated thin metal strip has corrugations having a triangular cross-section in which the apices are rounded.

7. A core element as defined in claim 1 wherein the corrugated thin metal strip includes a catalyst.

8. A core element for a catalytic converter as defined in claim 1 wherein the tabs are bent at an angle of from about 15 degrees to about 35 degrees along a single centrally located line lying longitudinally of the tab.

9. A core element as defined in claim 8 wherein the corrugated thin metal strip has a centrally located flat portion with respect to the ends of the strip.

10. A core element as defined in claim 1 wherein the corrugated thin metal strip is a high temperature resistive, oxidation resistant metal strip.

11. A core element as defined in claim 10 wherein the thin metal strip is a thin ferritic stainless steel strip.

12. A core element as defined in claim 10 wherein the thin metal strip is a nickel/chromium/aluminum/iron alloy metal strip.

13. A core element as defined in claim 1 wherein the corrugated thin metals strip has a coating of a refractory metal oxide on a surface thereof.

14. A core element as defined in claim 13 wherein the refractory metal oxide comprises alumina.

15. A core element as defined in claim 13 wherein the refractory metal oxide is an alumina/ceria mixture.

16. A core element as defined in claim 13 wherein the refractory metal oxide is a magnesia/ziconia mixture.

17. A core element as defined in claim 13 wherein the refractory metal oxide comprises titania.

18. A core element as defined in claim 13 wherein the refractory metal oxide coated corrugated thin metal strip includes a catalyst on the surface thereof.

19. A core element as defined in claim 18 wherein the catalyst is a noble metal catalyst.

20. A core element as defined in claim 19 wherein the noble metal is selected from the group consisting of palladium, platinum, rhodium, ruthenium and mixtures of two or more such metals.

21. A core for a catalytic converter comprising a bifurcated central pin having a pair of legs, a plurality of corrugated thin metal strips each having oppositely directed bent tabs secured to each end of each strip, said tabs being generally rectangular in shape and having shorter edges and longer edges, each of said tabs being secured to said corrugated thin metal strips along one of the longer edges, the opposite edge being free, and each of said tabs being angularly being along one or more lines lying longitudinally of the tab and generally normal to the shorter edges, said strips being located between the legs of said bifurcated pin, and said strips being spirally wound about said bifurcated pin whereby the tabs are in partially overlapped relation, and means for securing said partially overlapped tabs in said partially overlapped relation, and said secured partially overlapped tabs defining at least two electrically isolated generally circular segments.

22. A core as defined in claim 21 including woven ceramic tape strips at least partially surrounding the legs of said bifurcated central pin and electrically isolating said corrugated thin metal strips from contact therewith.

23. A core for a catalytic converter as defined in claim 21 wherein the tabs are bent at an angle of from about 15 degrees to about 35 degrees along a single centrally located line lying longitudinally of the tab.

24. A core for a catalytic converter as defined in claim 21 wherein the tabs are segments of a circle including from 10 degrees to 45 degrees of arc, and each having substantially the same radius of curvature.

25. An electrically heatable catalytic converter comprising (1) a housing, (2) end cap adapters for each end of the housing for adapting said converter for insertion in an exhaust line, said converter having an upstream end for contacting inlet exhaust gas containing pollutants, and a downstream end for exiting pollutant depleted exhaust gas; (3) a core for said catalytic converter having an upstream end and a downstream end and comprising (a) a bifurcated central pin having a pair of legs, (b) at least one group of corrugated thin metal strips, each said group including a plurality of corrugated thin metal strips, each strip having (c) oppositely directed bent metal tabs secured to each end of said corrugated thin metal strips, said tabs being generally rectangular in shape and having shorter edges and longer edges and having a length greater than the width thereof, and each of said tabs being secured to said corrugated thin metal strip along one of the longer edges, the other longer edge being free, said tabs being bent along one or more lines lying one or more lines parallel to the longer edges of the tab, said strips being located between the legs of said bifurcated central pin, and said at least one group of corrugated thin metal strips being spirally wound about said bifurcated central pin, whereby the tabs are in partially overlapped relation and define an outer periphery of the core, and (d) means for securing said partially overlapped tabs in said partially overlapped relation, and said partially overlapped tabs defining at least two electrically isolated generally circular segments, (e) woven ceramic fiber tape strips interposed between each leg of said bifurcated central pin and each group of corrugated thin metal strips and isolating said corrugated from contact with any adjacent groups of corrugated thin metal strips, (f) a transverse bar extending across the downstream end of said core welded to said bifurcated pin and having a portion of its surface thereof in contact with said corrugated thin metal strips of said core; (4) insulation means extending from said core and spirally wrapped about the outer periphery of said core and between said core and said housing; (5) a feed-through terminal extending through said housing secured to one of said generally circular segments for attachment to one pole of a voltage source; (6) a second terminal extending through the housing and secured to another of said generally circular segments for attachment to the other pole of a voltage source; and (7) a voltage source.

26. An electrically heatable catalytic converter as defined in claim 25 wherein the tabs are bent at an angle of from about 15 degrees to about 35 degrees along a single centrally located line lying longitudinally of the tab.

27. An electrically heatably catalytic converter as defined in claim 25 wherein the tabs are segments of a circle including from 10 degrees to 45 degrees of arc, and each having substantially the same radius of curvature.

* * * * *